United States Patent [19]
Innings et al.

[11] Patent Number: 6,009,832
[45] Date of Patent: Jan. 4, 2000

[54] METHOD OF CONTROLLING THE MILKING OF AN ANIMAL AND A MILKING MACHINE

[75] Inventors: Lars Innings, Huddinge; Ole Lind, Tumba; Benny Ornerfors, Jarfalla; Gunter Schlaiss, Tumba, all of Sweden

[73] Assignee: Alfa Laval Agri AB, Tumba, Sweden

[21] Appl. No.: 08/952,227

[22] PCT Filed: May 14, 1996

[86] PCT No.: PCT/SE96/00630

§ 371 Date: Jan. 22, 1998

§ 102(e) Date: Jan. 22, 1998

[87] PCT Pub. No.: WO96/36213

PCT Pub. Date: Nov. 21, 1996

[30] Foreign Application Priority Data

May 17, 1995 [SE] Sweden ................................ 9501836

[51] Int. Cl.⁷ .................................................. A01J 5/007
[52] U.S. Cl. ........................................................ 119/14.02
[58] Field of Search .............................. 119/14.02, 14.14, 119/14.18, 14.47, 14.48, 14.49, 14.5, 14.51, 14.52, 14.53

[56] References Cited

U.S. PATENT DOCUMENTS

| | | |
|---|---|---|
| 3,900,005 | 8/1975 | Goldsmith . |
| 4,211,184 | 7/1980 | Abrahamson . |
| 4,292,926 | 10/1981 | Tilman . |
| 4,344,385 | 8/1982 | Swanson ............................... 119/14.08 |
| 4,941,433 | 7/1990 | Hanauer ............................... 119/14.02 |
| 5,054,425 | 10/1991 | Grimm et al. . |
| 5,218,924 | 6/1993 | Thompson ........................... 119/14.02 |
| 5,245,947 | 9/1993 | Oosterling et al. .................. 119/14.48 |
| 5,443,035 | 8/1995 | Lind . |
| 5,651,329 | 7/1997 | Van Den Berg et al. ............ 119/14.02 |

FOREIGN PATENT DOCUMENTS

| | | |
|---|---|---|
| 65871 | 5/1982 | European Pat. Off. . |
| 584890 | 2/1990 | European Pat. Off. . |
| 3807256 | 9/1989 | Germany . |
| 382547 | 2/1976 | Sweden . |
| WO9212625 | 8/1992 | WIPO . |
| WO9314625 | 8/1993 | WIPO . |

*Primary Examiner*—Thomas Price
*Attorney, Agent, or Firm*—Hovey, Williams, Timmons & Collins

[57] ABSTRACT

In a milking machine having a cluster (2) with a number of teatcups (3) each teatcup (3) having a teatcup liner (6) and a pulsation chamber (7), the abrupt movement of the teatcup liner (6) between an open and a closed position is sensed. This sensed movement which is an indication of the milk flow is used to control the milking intensity.

32 Claims, 3 Drawing Sheets

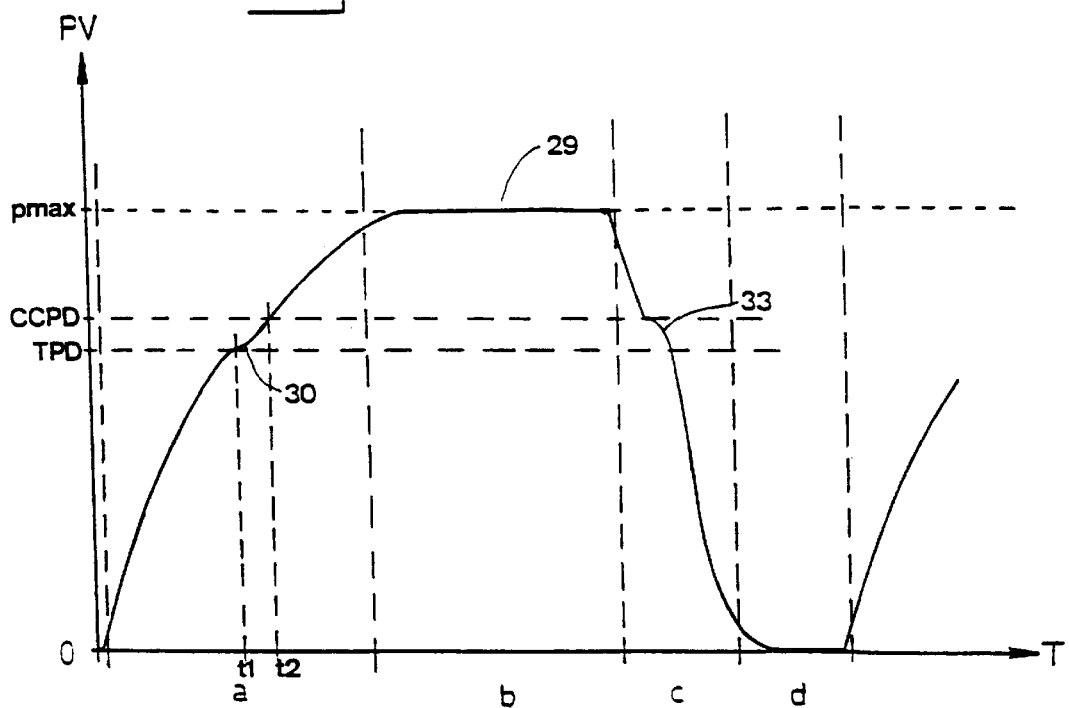
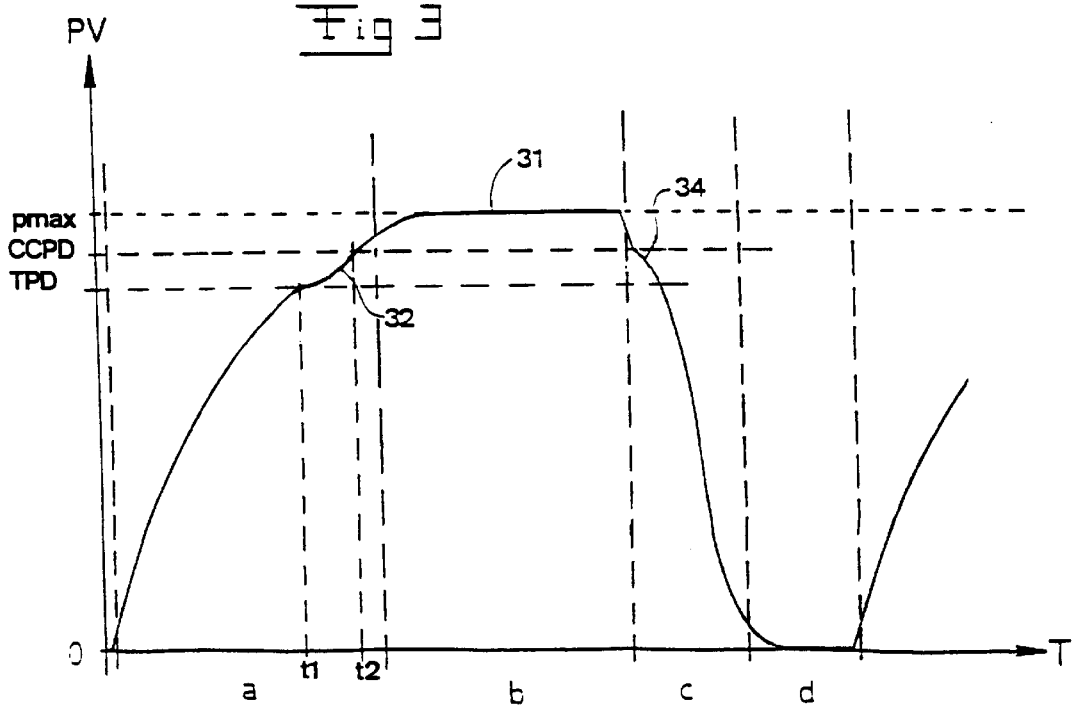

METHOD OF CONTROLLING THE MILKING OF AN ANIMAL AND A MILKING MACHINE

BACKGROUND OF THE INVENTION

1. Field of the Invention

The present invention relates to a method of milking an animal with a desired milking intensity by a milking machine having at least one teatcup with a teatcup liner and a pulsation chamber, the method comprising applying the teatcup to a teat of the animal, and applying a milking vacuum to the interior of the teatcup liner and a pulsating vacuum to the pulsation chamber so that the teatcup liner cyclically moves between a substantially open and a substantially closed position in a series of pulsation cycles. Moreover the invention relates to a milking machine comprising at least one teatcup having a teatcup liner and a pulsation chamber, a vacuum source for generating a milking vacuum in the interior of the teatcup liner and a pulsator provided to alternately connect the pulsation chamber to the atmosphere and to said vacuum source for generating a pulsating vacuum in the pulsation chamber to produce a pulsating movement of the teatcup liner between a substantially open and a substantially closed position.

2. Description of the Prior Art

Traditionally the milking machine comprises a cluster having a claw and four teatcups, each teatcup having a shell and a teatcup liner provided in the shell to form a pulsation chamber between the teatcup liner and the shell. During milking the interior of the teatcup liner is subjected to a milking vacuum, i.e. a low pressure of normally about 50 kPa under atmospheric pressure. There are also milking machines working under high pressure conditions, whereby the low pressure might be above atmospheric pressure. The pulsation chamber is subjected to a cyclically pulsating vacuum normally varying between atmospheric pressure, when the teatcup liner is collapsed or closed, and a maximum vacuum level when the teatcup liner is fully open. The maximum pulsating vacuum level is normally a low pressure level of 50 kPa under atmospheric pressure, i.e. equal to the milking vacuum level. This means that the pressure difference across the wall of the teatcup liner is essentially equal to zero when the teatcup liner is fully open.

The pulsating vacuum demonstrates a pulsation cycle which may be divided into four phases, i.e. (a) an opening phase during which the pulsating vacuum increases from atmospheric pressure to normally about the milking vacuum level and the teatcup liner moves from a closed position to an open position, (b) an open phase during which the pulsating vacuum has reached its maximum level and is essentially equal to the milking vacuum level and the teatcup liner is in an open position, (c) a closing phase during which the pulsating vacuum decreases from about the milking vacuum level to the atmospheric pressure and the teatcup liner moves from the open position to the closed position, and finally (d), a closed phase during which the pulsating vacuum is equal to the atmospheric pressure and the teatcup liner is in a closed position. The time relations between the open and the closed positions are defined in the pulsator ratio. The opening and the closing of the teatcup liner during phase (a) and (c), respectively comprises a very fast and abrupt movement of the teatcup liner. From a closed position, i.e. opposite wall portions of the teatcup liner touch each other, as the pulsating vacuum increases the teatcup liner remains essentially closed until it at a certain pulsating vacuum level, the so called TPD (touch pressure difference), starts to open abruptly to the so called CCPD (critical collapse pressure difference) at which level the teatcup liner is fully open, i.e. said opposite wall portions of the teatcup liner are spaced apart from each other. From the point of time when the pulsating vacuum exceeds the CCPD-level the teatucp liner thus is essentially open and a further increase of the pulsating vacuum only results in an insignificant further opening of the teatcup liner.

Each milking may be divided into four periods, i.e. (I) the initial stimulation or massage period, (II) the main flow period, (III) the flow decreasing period, and (IV) the flow terminating period. During the initial, flow decreasing and flow terminating period the milk flow is reduced in comparison with the main flow period.

In the prior art many proposals have been made for controlling the milking in response to the milk flow.

WO-A-9 212 625 discloses a method of operating a milking machine such that the pulsating vacuum increase and decrease are changed at a slower rate during the massage period, the flow decreasing period and the flow terminating period. During the main flow period the pulsating vacuum changes at a normal rate. By means of this way of operating the milking machine, the teatcup liner moves more slowly when the milk flow is reduced.

EP-A-584 890 and SE-B-382 547 both relate to the control of the pulsating vacuum in response to the milk flow which is detected by a milk flow sensor. EP-A-584 890 proposes to adjust the pulsator ratio in response to the milk flow such that the closed phase (d) is extended when the milk flow is reduced. SE-B-382 547 proposes to reduce the maximum pulsating vacuum level when the milk flow is less than a certain value.

Milk meters of different types are known. Firstly there are milk meters that count portions of constant weight or volume. Secondly there are milk meters that measure a continuous milk flow. These known devices are expensive and have a complicated structure and are normally only provided on the long milk tube leading the milk away from the teatcup claw. Consequently these devices are only able to measure the amount of milk of the total milk flow from all teatcups in a cluster.

The milk flow from one of the teats of the udder is not identical to the milk flow of the other teats of the udder. This means e.g. that the point of time when the milk flow ceases is different for each teat. This can be seen in a milk flow diagram showing the total milk flow from the udder as a stepwise reduction of the milk flow under the flow decreasing period. Therefore if the milking of an animal is interrupted only when the milk flow from all the teats has ceased, the teats which are subjected to a high milking vacuum although no milk is flowing are treated in a very unsatisfactory manner since the opening movement of the teatcup liner leads to a fast increase of the volume in the interior of the teatcup liner. Such volume increase will result in a momentary increase of the vacuum which may subject the exposed teat surface to a strong vacuum, resulting in stretching of the teat surface, and may lead to a back flow of the milk or milk droplets which are jetted with a very high velocity towards and against the teat tip. This is a rather ungentle treatment which may hurt the animal, lead to injuries on the teats and furthermore the backflow of milk increases the risk of transmitting diseases, e.g. mastitis. It may happen that bacteria associated with one teat passes directly into the interior of another teat, and thereby increasing the risk of infection.

Such a vacuum increase during in particular the terminating period may also result in that the teatcup is crawling upwards on the teat. Such crawling at the end of the milking as the teat becomes slack leads to a throttling of the milk conducting interior of the teat, and consequently the milk flow may be interrupted although a considerable amount of rest milk remains in the udder.

U.S. Pat. No. 4,292,926 aims to improve finish milking and discloses a mechanical milking method, wherein the milk flow is continuously measured during milking and the milking intensity is reduced dependent on the result of the measurement. Alternatively the pressure inside the head of the teat rubber is continuously measured when the milking intensity is abruptly reduced at the start of a drop of said pressure.

U.S. Pat. No. 4,211,184 discloses a method and an apparatus for milking with the aim to minimise vacuum damages to the teats of the animal. This document proposes to monitor the vacuum level in a ring chamber of the mouth piece of the teatcup and to control the pulsating vacuum in response thereto. The disclosed method and apparatus is described to operate such that the full milking vacuum level will be experienced in the ring chamber in the initial period to control the maximum pulsating vacuum to be at a low level, thus closing the teatcup liner, preventing the teatcup liner from crawling and preventing the strong milking vacuum from damaging the teat. At full milk flow the teat will be pressurized by the presence of milk in the teat resulting in a reduced vacuum level in the ring chamber and thus an increase in the maximum pulsating vacuum level. At the flow terminating period the vacuum level in the ring chamber will again increase, which once again reduces the maximum pulsating vacuum level.

WO-A-9 314 625 discloses a milking apparatus including for each claw a pulsator and a control unit responsive to the opening and closing of the teatcup liners. The pulsating switching characteristics of the pulsator are controlled by the control unit in sympathy with the opening and closing of the teatcup liners in order to improve the pulsation effectiveness, i.e. to ensure the fully collapsing and opening of the teatcup liner in a single pulsation cycle. Thus this piece of prior art provides a method in which the pulsator is not switched from the atmospheric pressure to a low pressure or vice versa until the liner is fully closed or opened, respectively. When the liners are fully closed or opened, the air flow in the pulsating vacuum pipe ceases. This cessation of air flow is detected by different means porposed in WO-A-9 314 625. For example such means comprises a piston and a cylinder device provided in the pulsating vacuum pipe, whereby the piston moves with the air flow and comes to rest at two opposite positions at which positions the piston is detected to give a signal to the pulsator to change between atmospheric pressure and low pressure. Other proposed means are a device comprising a rubber diaphragm moving in response to air flow, a rotating turbine device, and a hot wire galvanometer. None of the devices proposed in this document is provided to detect the opening or closing movement of the teatcup liner until this movement has already occurred. Moreover the detection of the completed movement is merely used for ensuring the fully opening and closing, respectively of the teatcup liner. Thus all the detecting devices proposed are directly connected to the pulsator only to influence the point of time for switching the pulsator between low pressure and atmospheric pressure varying with the movement of the teatcup liner.

SUMMARY OF THE INVENTION

The object of the present invention is to overcome the disadvantages mentioned above and to provide an improved way of controlling the milking process in response to the actual milk flow. This object is obtained by the method initially defined which is characterized by the steps of:

sensing the movement of the teatcup liner when the teatcup liner abruptly moves to one of the open and closed positions, and controlling the milking intensity in response to said sensed movement of the teatcup liner.

The level of the milking vacuum in the interior of the teatcup liner varies with the milk flow, and more specifically such that it decreases when the milk flow increases and increases when the milk flow decreases. A high milk flow gives a high energy loss due to the transportation work to be performed for transporting the milk away from the teatcup.

The term "milking intensity" is meant to include any operational measure taken to extract milk from the animals udder and teats. Thus a relatively high milking intensity primarily aims to produce a relatively high milk flow, whereas a relatively low milking intensity primarily aims to treat the teats gently while a relatively low milk flow is produced.

The abrupt opening or closing movement of the teatcup liner is dependent on the pressure difference across the teatcup liner. Therefore since a high milk flow results in a relatively low milking vacuum level, the opening of the teatcup liner will occur early in the pulsation cycle at a relatively low pulsating vacuum level, and since a low milk flow results in a relatively high milking vacuum level, the opening of the teatcup liner will occur later in the pulsation cycle at a relatively high pulsating vacuum level. Thus the abrupt movement of the teatcup liner may be used to indicate the size of the milk flow, and therefore the sensing of this movement may be used to control the milking intensity such that the latter is adjusted to the actual milk flow.

Controlling the milking intensity may comprise controlling one or more of milking parameters, such as the milking vacuum level, the maximum pulsating vacuum level, the pulsator ratio, the pulsating frequency, etc. E.g. a reduction of the milking intensity may be performed by reducing the milking vacuum level, the maximum pulsating vacuum level or the pulsator ratio, or by increasing the pulsating frequency.

The dependent claims 2 to 20 define various embodiments of the method.

According to one embodiment said controlling step comprises increasing the milking intensity when said sensed movement of the teatcup liner fulfils a determined condition and decreasing the milking intensity when said sensed movement of the teatcup liner does not fulfil said determined condition. Such a condition may be predetermined, e.g. a fixed value, or determined by the sensed movement of the teatcup liner during a previous pulsation cycle when the teatcup liner abruptly moves to one of the open and closed positions. In the latter case it is possible to exactly adjust the milking intensity in response to the actual milk flow. Preferably the milking intensity is increased when said sensed movement of the teatcup liner indicates a relatively high milk flow through the teatcup liner and decreased when said sensed movement of the teatcup liner indicates a relatively low milk flow in the teatcup liner.

According to a further embodiment said sensing step comprises detecting the value of a teatcup liner movement responsive variable when the teatcup liner abruptly moves to one of said open and closed positions, and said controlling step comprises increasing the milking intensity when the detected value is in a determined range and decreasing the milking intensity when the detected value is outside said range. Thereby said range may be predetermined or determined by the value of said teatcup liner movement responsive variable detected during a previous pulsation cycle. Preferably the variable is the pulsating vacuum in the pulsation chamber. The pulsating vacuum may be easily detected by means of a pressure sensor.

According to a further embodiment said sensing step comprises detecting the point of time from the beginning of at least one of the pulsation cycles when the teatcup liner abruptly moves to one of said open and closed positions, and said controlling step comprises increasing the milking intensity if the detected point of time is within a determined interval and decreasing the milking intensity if the detected point of time is outside said interval. Such an interval may be predetermined or determined by detecting the point of time from the beginning of a previous pulsation cycle when the teatcup liner abruptly moves to one of said open and closed positions. Furthermore said point of time is detected in response to the value of a teatcup liner movement responsive variable, e.g. the pulsating vacuum, when the teatcup liner abruptly moves to one of said open and closed positions. Said point of time may also be detected in response to the change of a teatcup liner movement responsive variable when the teatcup liner abruptly moves to one of said open and closed positions. Thereby the variable may be the volume of the pulsation chamber or the distance between the teatcup liner and a point fixed relative to the shell.

The object of the present invention is also obtained by the milking machine initially defined which is characterized by a sensor provided for sensing the movement of the teatcup liner when the teatcup liner abruptly moves to one of the open and closed positions, and an electronic processing unit adapted to control the milking intensity in response to said sensor sensing said movement of the teatcup liner.

The dependent claims 22 to 32 define various embodiments of the milking machine.

By means of the present invention the controlling of the milking process may be performed individually for each teat of the animal. In particular the milking intensity for each teatcup may be adjusted to the actual milk flow from the corresponding teat. This results in a more gentle teat treatment since milking vacuum may be immediately interrupted when the milk flow ceases. It also results in a higher milk yield since milking vacuum may still be applied on a teat of the udder although the milk flow from the other teats of this udder has already ceased.

BRIEF DESCRIPTION OF THE DRAWINGS

Embodiments of the present invention will now be described with reference to the accompanying drawings, in which FIG. 2 is a diagram illustrating the change of the pulsating vacuum during a pulsation cycle during high milk flow, FIG. 3 is a diagram illustrating the change of the pulsating vacuum during a pulsation cycle during low milk flow.

DESCRIPTION OF VARIOUS EMBODIMENTS OF THE PRESENT INVENTION

Figure 1:
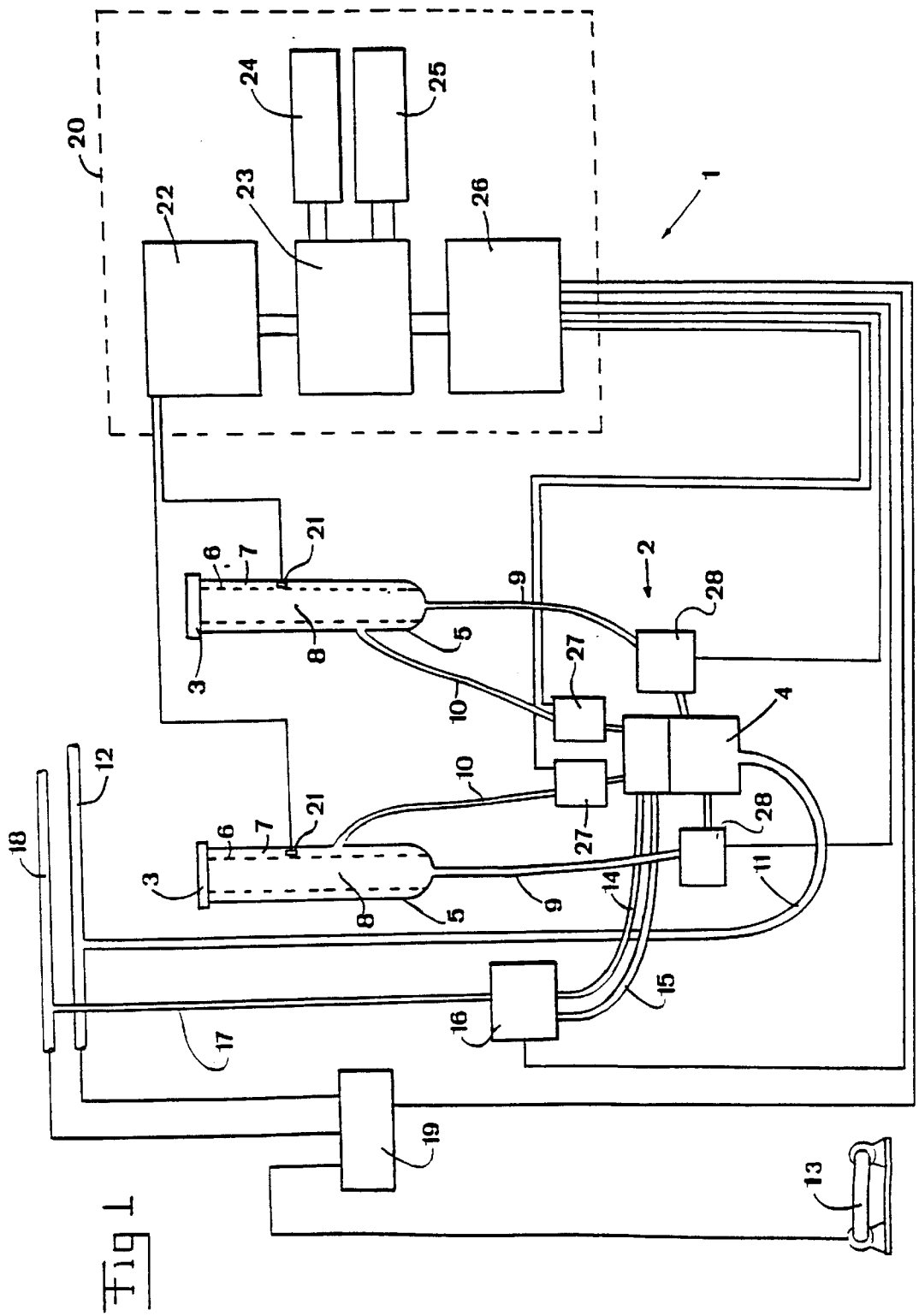
FIG. 1 shows a schematical view of a milking machine according to the invention.

FIG. 1 shows a milking machine 1 which comprises a cluster 2 including at least one teatcup 3 and a claw 4. In the disclosed embodiment two teatcups 3 are provided, although it may be more teatcups, e.g. four, depending on the animal to be milked. Each teatcup 3 comprises a shell 5 and a teaetcup liner 6. A pulsation chamber 7 is formed in the shell 5 and the teatcup liner 6. The interior of each teatcup liner 6 forms a milk conducting passage 8. The claw 4 is connected to the milk conducting passages 8 by short milk tubes 9, and to the pulsation chamber 7 by short pulse tubes 10. The short milk tubes 9 are via the claw 4 connected to a long milk tube 11 extending from the claw 4 to a milk line 12 which communicates with a vacuum pump 13. The short pulse tubes 10 are via the claw 4 connected in pairs to long pulse tubes 14, 15 which in turn are connected to a pulsator 16. The pulsator 16 is connected by one long pulse tube 17 to a pulsator air line 18 which communicates with the vacuum pump 13. Alternatively the long pulse tube 17 may be omitted and the pulsator 16 may be provided on the pulsator air line 18. A pressure regulator device 19 is provided between the vacuum pump 13 and the pulsator air line 18 and the milk line 12 in order to separately regulate the vacuum level to the pulsator air line 18 and to the milk line 12. An electronic processing unit 20 is connected to a sensor 21 provided to sense the movement of the teatcup liner 6. Although the sensor may be of different types, as will be explained below, this embodiment makes use of a pressure sensor 21 provided in at least one of the pulsation chambers 7 for sensing the pulsating vacuum. It should be noted that the pressure sensor 21 also may be provided in one of the short pulse tubes 10, the long pulse tubes 14, 15 and the claw 4.

The electronic processing unit 20 comprises different means which are illustrated as different functional blocks. It should be noted however that these functions may be performed by means of one of more microprocessors. The functional blocks are a recording means 22 connected to the sensor 21 for recording the sensed values of the pulsating vacuum, a processing means 23 connected to the recording means 22 for processing the recorded values, a detecting means 24, communicating with the processing means 23 to detect deviations, a comparing means 25 communicating with the processing means 23 to compare the detected value with a previous value, and a control means 26 to control at least one milking parameter. To this end the control means 26 is connected to regulators 27 for regulating the pulsating vacuum to each teatcup 3 individually. The regulators 27 are provided in the short pulse tubes 10. Moreover the control means 26 is connected to regulators 28 for regulating the milking vacuum to each teatcup 3 individually. The regulators 28 are provided in the short milk tubes 9. The control means 26 is also connected to the pulsator 16 to control the pulsator ratio. Preferably the pulsator ratio may be controlled individually for each teatcup 3. Finally the control means 26 is connected to the pressure regulating device for the overall control of the milking vacuum and the pulsating vacuum.

FIG. 2 shows a curve 29 of the pulsating vacuum PV in the pulsation chamber 7 as a function of time T during one pulsation cycle during a low milk flow period. The pulsating vacuum increases from zero (which corresponds to atmospheric pressure) during a phase (a) to a maximum pulsating vacuum level pmax of about 50 kPa. During a phase (b) the pulsating vacuum remains at the maximum level pmax and during a phase (c) it drops back to zero and remains at zero in phase (d). During the phase (a) the teatcup liner 6 is closed until the pulsating vacuum has reached the touch pressure difference, TPD, at which pulsating vacuum level the teatcup liner 6 suddenly and abruptly opens. Due to this opening movement of the teatcup liner 6 the volume of the pulsation chamber 7 decreases. This volume decrease results in a temporary interruption of the increase of the pulsating vacuum in the pulsation chamber 7, which gives rise to a distinct irregularity at a portion 30 in the curve 29 during phase (a), see the diagram of FIG. 2. By means of the pressure sensor 21 and the electronic processing unit 20 it is possible to detect the pulsating vacuum level at the portion 30, which level corresponds to the touch pressure difference TPD. FIG. 3 shows a corresponding curve 31 of the pulsating vacuum PV in the pulsation chamber 7 as a function of time T during one pulsation cycle during a low milk flow period. As can be seen the touch pressure difference TPD, see the portion 32, occurs later in the phase (a) as compared with the high milk flow curve 29.

Thus by comparing the detected pulsating vacuum level TPD with a predetermined range or value it is possible to determine whether the milk flow is high or low. Alternatively by comparing the detected pulsating vacuum level TPD of successive pulsation cycles it is possible to determine a change in the milk flow.

It should be pointed out that the abrupt movement of the teatcup liner 6 also may be detected during phase (c) when the pulsating vacuum decreases when the teatcup liner 6 closes at the critical collapse pressure difference, CCPD. During phase (c) there is a sudden volume increase of the pulsation chamber 7 which is indicated as a distinct irregularity at a portion 33 of the curve 29 in the diagram of FIG. 2 and as a distinct irregularity 34 of the curve 31 in the diagram of FIG. 3.

Although it appears from FIGS. 2 and 3 that the CPD-level is the same during phase (a) and (c) and that the TPD-level is the same during phase (a) and (c), it should be noted that this must not be the case.

The TPD-level or CCPD-level may be detected in various ways. One possibility is offered by sensing a variable which is responsive to the movement of the teatcup liner 6 and by detecting the pulsating vacuum level when the sensed variable indicates said abrupt opening or closing of the teatcup liner 6. For example this variable may be the increase rate or decrease rate, respectively, of the pulsating vacuum, whereby the pulsating vacuum level may be detected when this rate is temporarily reduced.

By the recording means 22 the pulsating vacuum may be recorded as a function of time as the pulsating vacuum increases or decreases during a pulsation cycle. The derivative of this recorded function may be determined by the processing means 23. Since the inclination of the curve 29, 31 is abruptly changed at the portions 30, 33 and 32, 34 the derivative will correspondingly change at these portions 30, 33 and 32, 34, which may be detected by the detecting means 24.

It is also possible to record the pulsating vacuum over time by the recording means 22 as the pulsating vacuum increases or decreases during a pulsation cycle during which the interior of the teatcup liner is exposed to the atmospheric pressure. This may be done as an initial measure before the actual milking process has started and during such pulsating vacuum increase or decrease the teatcup liner 6 will be fully open. Thereafter a pulsating vacuum/time function based on the recorded pulsating vacuum may be evaluated by the processing means 23. The pulsating vacuum level during a subsequent pulsation cycle of the milking process when the increase or decrease of the pulsating vacuum deviates a predetermined value from the pulsating vacuum/time function may be detected by the detecting means 24.

Moreover it is possible to record the change of the pulsating vacuum over time by the recording means 22 as the pulsating vacuum increases or decreases during the pulsating cycle. Thereafter a pulsating vacuum/time function based on the recorded pulsating vacuum and on the prerequisite that the volume of the pulsation chamber 7 is kept constant may be evaluated by the processing means 23. The pulsating vacuum during a subsequent pulsation cycle of the milking process may be sensed by the sensor 21, and when the sensed pulsating vacuum deviates a predetermined value from the evaluated pulsating vacuum/time function this may be detected by the detecting means 24.

Furthermore it is also possible to record the pulsating vacuum over time during the increase or decrease of the pulsating vacuum during one pulsation cycle by the recording means 22 and to have the processing means 23 to evaluate an extrapolated mathematical function by means of a few initial values of the recorded pulsating vacuum. Thereafter the detecting means 24 may detect the pulsating vacuum level when the increase or decrease of the pulsating vacuum deviates a predetermined value from the extrapolated mathematical function.

Figure 4:
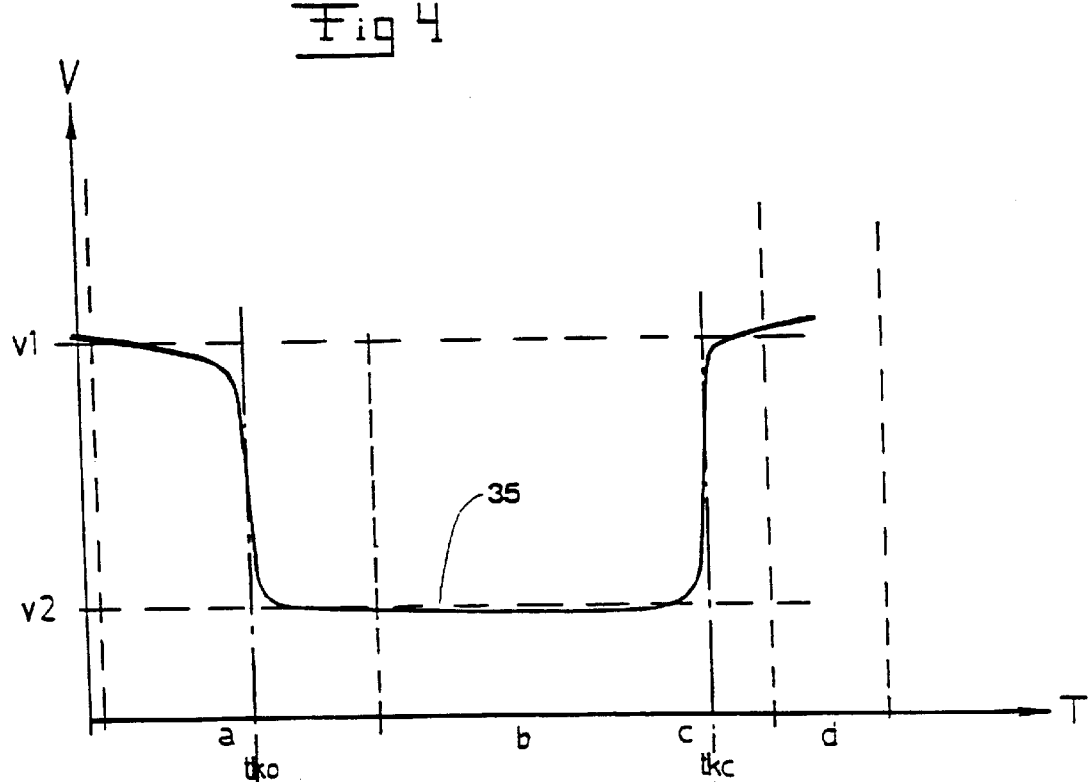
FIG. 4 is a diagram illustrating the change of the volume of the pulsation chamber during a pulsation cycle during high milk flow.
Figure 5:
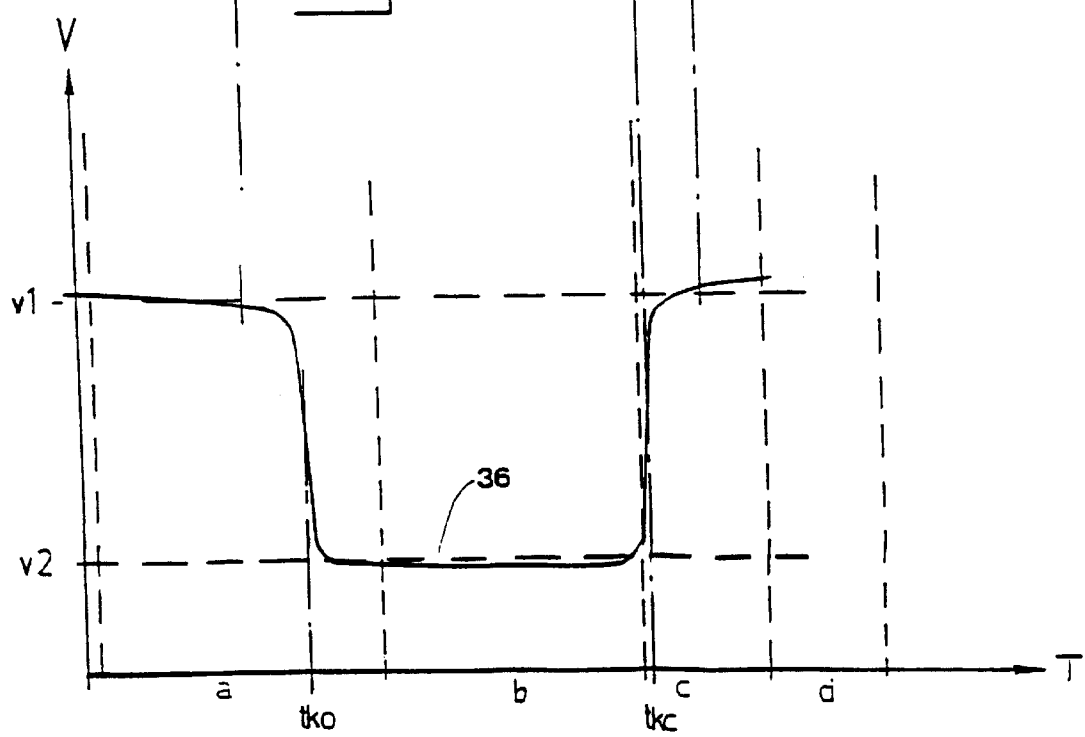
FIG. 5 is a diagram illustrating the change of the volume of the pulsation chamber during a pulsation cycle during low milk flow.

As mentioned above the abrupt movement of the teatcup liner 6 results in a rapid volume change of the pulsation chamber 7. During phase (a) the pulsating vacuum initially increases while the volume of the pulsating chamber 7 essentially remains the same and when the pulsating vacuum reaches the touch pressure difference TPD the teatcup liner 6 opens and the volume of the pulsating chamber 7 suddenly decreases. This is shown in FIG. 4 and 5 by means of a volume-time diagram presenting a curve 35 and 36, respectively of the volume V of the pulsation chamber 7 as a function of time T. The curve 35 refers to a low milk flow while curve 36 refers to a high milk flow. The volume v1 of the pulsation chamber 7 during the beginning of phase (a) is essentially constant. At a TPD-level, i.e. at the abrupt opening movement tko, the volume decreases rapidly, is essentially constant at a volume v2 during phase (b) and increases rapidly to the volume v1 at the abrupt closing movement tkc of the teatcup liner 6 during the decrease of the pulsating vacuum. As can be seen from FIGS. 4 and 5 the abrupt volume change due to the opening movement tko occurs earlier during high milk flow, see FIG. 4, than during low milk flow, see FIG. 5, whereas the abrupt volume change due to the closing movement tkc occurs later during high milk flow than during low milk flow.

Such a volume change may be detected by different types of sensors 21. For example a flow meter 21 measuring the air flow in or to and from the pulsation chamber 7 may be provided. Thus during the opening and closing movements there will be a sudden air flow, and between the opening and closing movements the air flow is essentially stopped.

The volume change may also be detected by the distance measuring device 21, sensing the distance between a point, fixed relative to the shell 5, and the teatcup liner 6. Such a sensor may be a distance measuring device 21 using infrared light and attached to the inner wall of the shell 5.

Thus by comparing the point of time tko, tkc for the opening or closing, respectively of the teatcup liner 6 with a predetermined range or value, it is possible to determine whether the milk flow is high or low. Alternatively by comparing the point of time tko, tkc for the opening and closing, respectively of the teatcup liner 6 of successive pulsation cycles, it is possible to determine a change in milk flow.

Such a deviation in time may be detected by means of the electronic processing unit 20 provided that the processing means 23 comprises a time measuring means, such that the point of time for the opening and closing, respectively, of the teatcup liner 6 may be determined and recorded.

It should be pointed out that it is also possible to determine the point of time when the increase rate or decrease rate of the pulsating vacuum is temporarily reduced.

A further possibility of sensing the movement of the teatcup liner 6 is offered by detecting TPD and CCPD during one of phase (a) or phase (c) during one pulsation cycle and measuring the time period, t1–t2, between TPD and CCPD during one of these phases. Since the slope of the curve 29, 31 is decreasing over time during phase (a) and phase (c) this time period t1–t2 will be shorter during high milk flow, see FIG. 2, than during low milk flow, see FIG. 3.

It should also be pointed out that the detection of the teatcup liner 6 movements may occur continuously so that an estimate of the momentary milk flow during the whole milking process is obtained.

As has been shown above it is possible to determine a change in the milk flow by detecting the movements of the teatcup liners 6. First of all it is possible to determine a decrease or increase in the milk flow. Secondly by detecting the movement of the teatcup liner 6 in the beginning of the milking process before the milk flow has started and by comparing this zero flow movement with later movements when milk flow exists, it is possible to determine an absolute momentary milk flow. However by such determination certain milking machine related conditions, such as e.g. the length of different pipes, the effect of the vacuum pump, etc. have to be considered. The detected change or milk flow may be used to control the milking process in various ways. Since the milk flow change or milk flow from each teat may be determined it is possible to control the milking process for each teatcup 3 individually. This is important e.g. when the milk flow from one teat of an animal has ceased. Then the milking intensity exposed to said teat may be changed to zero by interrupting the milking vacuum to a corresponding teatcup 3 by means of the regulator 28 in the short milk tube 9, in order not to injure this teat.

Another possibility is that when e.g. a reduction of the milk flow has been detected, the milking intensity may be reduced. This may be performed in various ways, e.g. by controlling the pulsator ratio such that closed phases are prolonged, by controlling the pulsating frequency, a high frequency prevents the liner from fully opening and closing and thus reduces milking intensity, by controlling the milking vacuum, by controlling the pulsating vacuum, etc.

Moreover the determined change in milk flow may be used to control at least one of the pulsating vacuum and the milking vacuum levels such that the maximum pulsating vacuum level is significantly lower than the milking vacuum during in particular the low milk flow periods.

The present invention may be applied to fully automatic milking and milking requiring manual attachment of the teatcups and is suitable for milking of animals such as cows, sheep, goats and buffalos.

We claim:

1. A method of milking an animal with a desired milking intensity by a milking machine having at least one teatcup with a teatcup liner and a pulsation chamber, the method comprising applying the teatcup to a teat of the animal, and applying a milking vacuum to the interior of the teatcup liner and a pulsating vacuum to the pulsation chamber so that the teatcup liner cyclically moves between a substantially open and a substantially closed position in a series of pulsation cycles, and further including the steps of sensing the movement of the teatcup liner when the teatcup liner abruptly moves to one of the open and closed positions, and controlling the milking intensity in response to said sensed movement of the teatcup liner.

2. A method according to claim 1, wherein said controlling step comprises increasing the milking intensity when said sensed movement of the teatcup liner fulfils a determined condition and decreasing the milking intensity when said sensed movement of the teatcup liner does not fulfil said determined condition.

3. A method according to claim 2, wherein said condition is predetermined.

4. A method according to claim 2, wherein said condition for the actual pulsation cycle is determined by the sensed movement of the teatcup liner during a previous pulsation cycle when the teatcup liner abruptly moves to one of the open and closed positions.

5. A method according to claim 2, wherein the milking intensity is increased when said sensed movement of the teatcup liner indicates a relatively high milk flow through the teatcup liner and decreased when said sensed movement of the teatcup liner indicates a relatively low milk flow in the teatcup liner.

6. A method according to claim 2, wherein said sensing step comprises detecting the value of a teatcup liner movement responsive variable when the teatcup liner abruptly moves to one of said open and closed positions, and said controlling step comprises increasing the milking intensity when the detected value is in a determined range and decreasing the milking intensity when the detected value is outside said determined range.

7. A method according to claim 6, wherein said range is predetermined.

8. A method according to claim 6, wherein said range for the actual pulsation cycle is determined by the value of said teatcup liner movement responsive variable detected during a previous pulsation cycle.

9. A method according to claim 6, wherein the variable is the pulsating vacuum in the pulsation chamber.

10. A method according to claim 9, wherein the milking intensity is increased if the detected value of the pulsating vacuum, when the teatcup liner abruptly moves, is lower than a determined pulsating vacuum level and decreased if the detected value of the pulsating vacuum, when the the teatcup liner abruptly moves, is at least as high as said determined pulsating vacuum level.

11. A method according to claim 10, wherein the determined pulsating vacuum level is predetermined and chosen such that the milk flow through the teatcup liner is relatively low when said detected value of the pulsating vacuum is at least as high as said predetermined level and relatively high when said detected value of the pulsating vacuum is lower than said predetermined level.

12. A method according to claim 10, wherein the determined pulsating vacuum level for the actual pulsation cycle is determined by the value of the pulsating vacuum detected during a previous pulsation cycle when the teatcup liner abruptly moves to one of the open and closed positions.

13. A method according to claim 2, wherein said sensing step comprises detecting the point of time from the beginning of at least one of the pulsation cycles when the teatcup liner abruptly moves to one of said open and closed positions, and said controlling step comprises increasing the milking intensity if the detected point of time is within a determined interval and decreasing the milking intensity if the detected point of time is outside said determined interval.

14. A method according to claim 13, wherein said interval is predetermined and chosen such that the milk flow through the teatcup liner is relatively low when said detected point of time is within said interval and relatively high when said detected point of time is outside said interval.

15. A method according to claim 13, wherein said interval for the actual pulsation cycle is determined by the point of time from the beginning of a previous pulsation cycle when the teatcup liner abruptly moves to one of said open and closed positions.

16. A method according to claim 13, wherein said point of time is detected in response to the value of a teatcup liner movement responsive variable when the teatcup liner abruptly moves to one of said open and closed positions.

17. A method according to claim 16, wherein the variable is the pulsating vacuum in the pulsation chamber.

18. A method according to claim 13, wherein said point of time is detected in response to the change of a teatcup liner movement responsive variable when the teatcup liner abruptly moves to one of said open and closed positions.

19. A method according to claim 18, wherein the variable is the volume of the pulsation chamber.

20. A method according to claim 18, wherein the teatcup comprises a shell and that the variable is the distance between the teatcup liner and a point fixed relative to the shell.

21. A milking machine comprising at least one teatcup having a teatcup liner and a pulsation chamber, a vacuum source for generating a milking vacuum in the interior of teatcup liner and a pulsator provided to alternately connect the pulsation chamber to the atmosphere and to said vacuum source for generating a pulsating vacuum in the pulsation chamber to produce a pulsating movement of the teatcup liner between a substantially open and a substantially closed position, including:
  a sensor provided for sensing the movement of the teatcup liner when the teatcup liner abruptly moves to one of the open and closed positions; and
  an electronic processing unit adapted to control the milking intensity in response to said sensor sensing said movement in the teatcup liner.

22. A milking machine according to claim 21, wherein the electronic processing unit is adapted to increase the milking intensity in response to said sensor sensing a movement of the teatcup liner fulfilling a determined condition, and decreasing the milking intensity in response to said sensor sensing a movement of the teatcup liner not fulfilling said determined condition.

23. A milking machine according to claim 22, wherein the electronic processing unit comprises comparing means adapted to compare the teatcup liner movement sensed by said sensor with a determined teatcup liner movement fulfilling said condition.

24. A milking machine according to claim 22, wherein the electronic processing unit comprises comparing means adapted to compare the teatcup liner movement sensed by said sensor during an actual pulsation cycle with a teatcup liner movement sensed by said sensor during a previous pulsation cycle, and control means adapted to change the milking intensity in response to the comparing results obtained by the comparing means.

25. A milking machine according to claim 21, wherein the electronic processing unit comprises control means adapted to control the milking intensity by controlling at least one milking parameter.

26. A milking machine according to claim 25, wherein the control means is connected to at least one of a milking vacuum regulating device, a pulsating vacuum regulating device and a pulsator.

27. A milking machine according to claim 21, wherein the electronic processing unit comprises detecting means adapted to detect the movement of the teatcup liner to one of the open and closed positions.

28. A milking machine according to claim 21, wherein the electronic processing unit comprises detecting means adapted to detect the point of time from the beginning of at least one of successive pulsation cycles when the teatcup liner abruptly moves to one of said open and closed positions.

29. A milking machine according to claim 28, wherein the electronic processing unit comprises recording means connected to the sensors and adapted to record the value of a teatcup liner movement responsive variable varying with the movement of the teatcup liner when the teatcup liner abruptly moves to one of said open and closed positions, and in that the detecting means is adapted to detect the point of time in response to said recorded value.

30. A milking machine according to claim 21, wherein the sensor is a pressure sensor for sensing the pulsating vacuum in the pulsation chamber as an indication of the movement of the teatliner.

31. A milking machine according to claim 21, wherein the sensor is a flow meter for sensing the change of the volume of the pulsating chamber as an indication of the movement of the teatcup liner.

32. A milking machine according to claim 21, wherein the teat cup comprises a shell enclosing the teatcup liner, the pulsation chamber being defined between the shell and the teatcup liner and that the sensor is a distance measuring device for sensing the distance between a point fixed relative to the shell and the teatcup liner as an indication of the movement of the teatcup liner.

* * * * *